United States Patent Office 3,284,210
Patented Nov. 8, 1966

3,284,210
FEED COMPOSITIONS CONTAINING N-SUBSTITUTED AMINOOXYACETIC ACID COMPOUNDS AND METHODS
Hans R. Rosenberg, Wilmington, Del., assignor to E. I. du Pont de Nemours and Company, Wilmington, Del., a corporation of Delaware
No Drawing. Filed Feb. 9, 1962, Ser. No. 172,083
10 Claims. (Cl. 99—2)

This invention relates to feed supplements for animals and more particularly to novel feed compositions containing a small amount of a N-substituted aminooxyacetic acid compound including salts and esters thereof.

According to the present invention, it has been found that the addition of a small amount of a compound, defined in Formula 1 below, to livestock and poultry rations results in improved animal growth and better feed efficiency. The inclusion in conventional poultry feeds and diets has a particularly stimulating effect on chick growth.

Useful compounds according to this invention are those of the following formula:

(1) 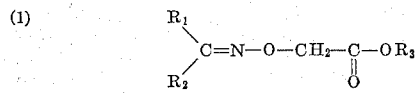

wherein
$R_1$ is hydrogen or alkyl of 1 through 6 carbon atoms;
$R_2$ is hydrogen, alkyl of 1 through 5 carbon atoms or the radical $-CO_2R_3$; with the proviso that $R_1$ and $R_2$ can be joined becoming $-(CH_2)_n-$ where $n$ equals 4, 5 or 6 and a methyl, ethyl, propyl or isopropyl group can be substituted on the ring; and
$R_3$ is hydrogen, alkyl of 1 through 4 carbon atoms, sodium, potassium, calcium or magnesium.

It should be understood that the ring can be substituted with one, two or three alkyl radicals each having up to 3 carbon atoms without departing from the scope of this invention.

Preferred compounds are those where $R_1$ and $R_2$ are joined to form cycloalkylidene derivatives without alkyl substituents on the ring.

Illustrative of some compounds used in this invention are the following:

(1) Cyclohexylideneaminooxyacetic acid
(2) 2-methyl-3-butylideneaminooxyacetic acid
(3) 2-methyl-3-butylideneaminooxyacetic acid, methyl ester
(4) 2-ethyl-3-butylideneaminooxyacetic acid
(5) 2-ethyl-3-butylideneaminooxyacetic acid, ethyl ester
(6) 2-isopropyl-3-butylideneaminooxyacetic acid
(7) 2-isopropyl-3-butylideneaminooxyacetic acid, propyl ester
(8) 2-propyl-3-butylideneaminooxyacetic acid
(9) 2-propyl-3-butylideneaminooxyacetic acid, isopropyl ester
(10) Cyclopentylideneaminooxyacetic acid
(11) 6-dodecylideneaminooxyacetic acid
(12) 6-dodecylideneaminooxyacetic acid, butyl ester
(13) Methylideneaminooxyacetic acid
(14) Methylideneaminooxyacetic acid, isobutyl ester
(15) Ethylideneaminooxyacetic acid
(16) Ethylideneaminooxyacetic acid, tert-butyl ester
(17) Pentylideneaminooxyacetic acid
(18) Pentylideneaminooxyacetic acid, sodium salt
(19) 3-octylideneaminooxyacetic acid
(20) 3-octylideneaminooxyacetic acid, potassium salt
(21) 2-methyl-6-octylideneaminooxyacetic acid
(22) 2-methyl-6-octylideneaminooxyacetic acid, hemi-calcium salt
(23) 4-propyl-5-octylideneaminooxyacetic acid
(24) 4-propyl-5-octylideneaminooxyacetic acid, hemi-magnesium salt
(25) 2-methyl-3-propylideneaminooxyacetic acid
(26) 2-methyl-3-propylideneaminooxyacetic acid, ethyl ester
(27) 1-carboxymethylideneaminooxyacetic acid
(28) 1-carboxymethylideneaminooxyacetic acid, propyl ester
(29) 2-carboxy-4-pentylideneaminooxyacetic acid
(30) 2-carboxy-4-pentylideneaminooxyacetic acid, butyl ester
(31) disodiumcarboxyhexylideneaminooxyacetate
(32) 1-(methoxycarbonyl)hexylideneaminooxyacetic acid, sodium salt
(33) 1-(methoxycarbonyl)hexylideneaminooxyacetic acid, isobutyl ester
(34) Sodiumcarboxyhexylideneaminooxyacetic acid
(35) Sodiumcarboxyhexylideneaminooxyacetic acid, sodium salt
(36) Calciumcarboxybutylideneaminooxyacetic acid
(37) Calciumcarboxybutylideneaminooxyacetic acid, hemi-calcium salt
(38) 1-(butoxycarbonyl)propylideneaminooxyacetic acid
(39) 1-(butoxycarbonyl)propylideneaminooxyacetic acid, potassium salt
(40) Cyclohexylideneaminooxyacetic acid, ethyl ester
(41) Cyclohexylideneaminooxyacetic acid, n-butyl ester
(42) Cyclopentylideneaminooxyacetic acid, ethyl ester
(43) Cyclohexylideneaminooxyacetic acid, hemi-calcium salt
(44) Cyclohexylideneaminooxyacetic acid, sodium salt
(45) Cyclohexylideneaminooxyacetic acid, methyl ester
(46) Cyclohexylideneaminooxyacetic acid, propyl ester
(47) Cyclohexylideneaminooxyacetic acid, isopropyl ester
(48) Cyclohexylideneaminooxyacetic acid, isobutyl ester
(49) Cyclohexylideneaminooxyacetic acid, tert-butyl ester
(50) Cyclohexylideneaminooxyacetic acid, potassium salt
(51) Cyclohexylideneaminooxyacetic acid, hemi-magnesium salt
(52) Cyclobutylideneaminooxyacetic acid
(53) Cyclobutylideneaminooxyacetic acid, methyl ester
(54) Cyclobutylideneaminooxyacetic acid, ethyl ester
(55) Cyclobutylideneaminooxyacetic acid, propyl ester
(56) Cyclobutylideneaminooxyacetic acid, isopropyl ester
(57) Cyclobutylideneaminooxyacetic acid, butyl ester
(58) Cyclobutylideneaminooxyacetic acid, isobutyl ester
(59) Cyclobutylideneaminooxyacetic acid, tert-butyl ester
(60) Cyclobutylideneaminooxyacetic acid, sodium salt
(61) Cyclobutylideneaminooxyacetic acid, potassium salt
(62) Cyclobutylideneaminooxyacetic acid, hemi-calcium salt
(63) Cyclobutylideneaminooxyacetic acid, hemi-magnesium salt
(64) Cyclopentylideneaminooxyacetic acid, methyl ester
(65) Cyclopentylideneaminooxyacetic acid, propyl ester
(66) Cyclopentylideneaminooxyacetic acid, isopropyl ester
(67) Cyclopentylideneaminooxyacetic acid, butyl ester
(68) Cyclopentylideneaminooxyacetic acid, isobutyl ester

(69) Cyclopentylideneaminooxyacetic acid, tert-butyl ester
(70) Cyclopentylideneaminooxyacetic acid, sodium salt
(71) Cyclopentylideneaminooxyacetic acid, potassium salt
(72) Cyclopentylideneaminooxyacetic acid, hemi-calcium salt
(73) Cyclopentylideneaminooxyacetic acid, hemi-magnesium salt
(74) (o-Methylcyclohexylideneaminooxy)acetic acid
(75) (p-Methylcyclohexylideneaminooxy)acetic acid, hemi-magnesium salt
(76) (o-Ethylcyclohexylideneaminooxy)acetic acid
(77) (p-Isopropylcyclohexylideneaminooxy)acetic acid, potassium salt The compounds within the scope of this invention can be prepared from the corresponding oxime by reaction with chloroacetic acid or a derivative thereof having the formula $ClCH_2COOR_3$ where $R_3$ is the same as above, and a base such as sodium hydroxide.

Compounds of this invention not only improve the rate of weight gain and total weight of animals, especially chickens, but they also have remarkably low toxicity. This factor allows compounds within the scope of this invention to be fed safely to chickens at high concentration.

The active compound within the scope of this invention is mixed with feed by any conventional means. This can be done advantageously by grinding such compound with some of the grain, such as, for instance, corn, or with other components of conventional animal feed such as vitamins, soybean meal, chlorine chloride, limestone flour, granite flour, oyster shell flour, fish flour, or the like, to provide a concentrated composition containing a compound of Formula 1 in any convenient amount, generally about 5 to 50% by weight. The ground mixture can then be further mixed in a proper proportion with the feed.

It will be understood that the feed supplement in the nature of a concentrate consisting of a compound within the scope of this invention and a solid or liquid carrier can be sold to the trade for incorporation in feeds. The compound of Formula 1 will be present in the feed supplement concentrate in sufficient quantity to give the desired ratio of a compound of Formula 1 to feed in the final composition fed to animals. The carrier present in the feed supplements of this invention may or may not have nutritional value. Illustrative of the solid carriers which can be employed in the novel feed supplements, there can be named soybean meal, choline chloride, vitamins (i.e. riboflavin, niacin, vitamin $B_{12}$, vitamin D), cottonseed meal, corn, mineral mixtures, walnut shells, diatomaceous earth, and the like.

Illustrative of liquid carriers are water, molasses, vegetable oils, animal fats, non-toxic solutions containing urea, phosphates and other nutrients. These named carriers along with any others known in the feed industry to be employed in feed supplements can be used in the compositions of this invention.

If desired, a compound of Formula 1 can be supplied to the user in the form of a higher concentrated mixture with a carrier or feed supplement, as described above, and the user can then simply add the required amount of this mixture to a larger quantity of standard feed.

The amount of a compound of Formula 1 added to the animal diet will depend upon the attendant circumstances and the nature of the effect desired. The level of the compound in the feed should not be less than .0005% nor greater than about 0.5%, based on the total weight of the animal's feed. Expressed in another way, the amount of active compound within the scope of this invention in the animal's feed will ordinarily be within the range from about 4 to 5,000 grams of a compound of Formula 1 per ton of animal feed.

Using the cyclohexylideneaminooxyacetic acid compound, a preferred amount of from about 20 to 200 grams of this compound per ton of feed exerts a growth improvement in feeding chicks approximately equal to that realized by feeding chicks procaine penicillin at the level which is commercially practiced.

In order that the invention may be better understood, the following illustrative examples are given. Those skilled in the art will appreciate that other compositions according to this invention can be prepared and applied in accordance with the examples.

*Example 1*

A chick diet is compounded from the ingredients and in the amounts as follows:

| | Parts by weight |
|---|---|
| Yellow corn | 49.0 |
| Corn gluten meal | 5.0 |
| Distillers' solubles | 4.0 |
| Alfalfa meal | 2.0 |
| Soybean meal | 28.0 |
| Calcite flour | 1.5 |
| Bone meal | 2.5 |
| Iodized salt | 0.25 |
| Manganese sulfate | 0.025 |
| Nicarbazine | 0.025 |
| Vitamins A and D oil | 1.0 |
| Choline chloride | 0.05 |
| Methionine hydroxy analog | 0.05 |
| Mixed vitamins | 0.10 |
| Fat | 6.5 |
| | 100.00 |

Two groups of day-old New Hampshire chicks are placed in separate pens and fed under controlled diet conditions for a period of twenty-eight days. One group is provided with the above basal chick diet while the second group is fed the same diet to each ton of which is added 75 grams of cyclohexylideneaminooxyacetic acid.

The group receiving the cyclohexylideneaminooxyacetic acid supplement shows an average improvement of 24.5% in weight increase compared with the control group. Also, the group receiving the feed supplement according to this invention exhibits a significant improvement in feed conversion of approximately 10.0% when compared with the control group.

*Example 2*

Two groups of turkey poults are placed in separate pens and fed the identical commercial feed of the following composition, wherein the indicated amounts are percent by weight:

| | Percent |
|---|---|
| Corn meal, yellow | 38.95 |
| Soybean oil meal dehulled | 32.00 |
| Alfalfa meal, dehydrated | 2.00 |
| Fish meal | 5.00 |
| Whey (dried) | 2.00 |
| Brewers' yeast | 3.00 |
| Liver meal | 2.00 |
| Meat and bone meal | 4.00 |
| Prime beef tallow | 5.00 |
| Calcite flour | 2.00 |
| Dicalcium phosphate | 2.00 |
| Choline chloride | 0.02 |
| Vitamin $D_3$ supplement (3000 ICU/gram) | 0.08 |
| Vitamin A supplement (5000 USP units/gram) | 0.40 |
| Iodized salt | 0.45 |
| Manganese sulfate | 0.05 |
| Ca-Methionine hydroxy analog | 0.05 |
| Vitamin premix | 1.00 |
| | 100.00 |

One part of the vitamin premix contains the following ingredients in such amount as to provide the following concentrations in the final feed:

| | Percent |
|---|---|
| Niacin | 0.004 |
| Calcium pantothenate | 0.002 |
| Riboflavin | 0.0005 |
| Folic acid | 0.0001 |
| Vitamin $B_{12}$ | 0.000002 |

Each group of these turkeys is maintained on this identical basal diet until reaching commercial sale weight, with the exception that one of the groups has incorporated with its feed cyclohexylideneaminooxyacetic acid in an amount of 0.02% by weight based on the total weight of the feed. The group receiving this compound as a supplement shows a significant improvement in performance over the first group.

*Example 3*

This example demonstrates the practice of the invention by incorporating in a commercial swine animal diet (20% protein sow and pig feed) various amounts of cyclohexylideneaminooxyacetic acid within the ranges described above for this invention. A basal swine feed diet is utilized containing wheat flour middlings, corn meal, oats, alfalfa meal, soybean meal, meat scraps, and supplement of vitamins, minerals and antibiotics. The animal fat is preserved with anti-oxidants. In addition to a control group, additional separate groups of swine are fed, besides the basal diet, cyclohexylideneaminooxyacetic acid salt in an amount of, respectively 10 grams, 25 grams, 50 grams, 75 grams, 100 grams and 200 grams per ton of feed, with resulting significant improvement in weight increase and feed conversion evidenced in those groups receiving the cyclohexylideneaminooxyacetic acid feed supplement.

*Example 4*

Three concentrate compositions are made by admixing respectively (1) 0.5, (2) 2.5 and (3) 5.0 grams of cyclohexylideneaminooxyacetic acid with ground corn to make, in each case, a total mix of 250 grams.

A basal diet is prepared of the following ingredients, wherein the figures given are percent by weight:

| | Percent |
|---|---|
| Yellow corn | 47.52 |
| Soybean meal (dehulled, 50%) | 28.80 |
| Fat | 10.05 |
| Alfalfa meal | 2.00 |
| Fish meal | 4.00 |
| Dried whey | 2.00 |
| Corn distillers' solubles | 2.00 |
| Calcite flour | 1.00 |
| Dicalcium phosphate | 1.25 |
| Iodized salt | 0.25 |
| Manganese sulfate | 0.03 |
| Vitamin supplement | 1.00 |
| Ca-Methionine hydroxy analog | 0.10 |
| | 100.00 |

The vitamin supplement provides the following in milligrams per one hundred grams of diet:

| Alpha-tocopherol | 0.25 |
|---|---|
| Niacin | 2.00 |
| D-calcium pantothenate | 1.00 |
| Riboflavin | 0.25 |
| Folic acid | 0.05 |
| Menadione | 0.05 |
| Vitamin $B_{12}$ | 0.0011 |
| Choline chloride | 50.00 |
| Vitamin $D_3$ supplement (3000 ICU/gram) | 50.00 |
| Vitamin A supplement (5000 USP units/gram) | 100.00 |

A coccidiostat can be added to the above as required.

Concentrates (1), (2) and (3) are admixed in suitable amounts with three separate portions of the basal diet to provide feeds containing respectively 0.002%, 0.01% and 0.02% by weight of the cyclohexylideneaminooxyacetic acid compound.

Eight groups each containing 48 male cross-bred chicks are used in this test. Two groups are given the feed containing 0.002%, two groups that contain 0.01% and two other groups that contain 0.02% of the cyclohexylideneaminooxyacetic acid compound. Two other groups are given only the basal diet thereby serving as control groups.

Test results after a period of only two weeks are as follows:

| Group | Diet | Weight gain (average, in grams) | Feed/gain (average) |
|---|---|---|---|
| A | Basal only | 152 | 1.60 |
| B | Basal only | | |
| C | Basal plus 0.002% cyclohexylideneaminooxyacetic acid. | 166 | 1.47 |
| D | Basal plus 0.002% cyclohexylideneaminooxyacetic acid. | | |
| E | Basal plus 0.01% cyclohexylideneaminooxyacetic acid. | 185 | 1.45 |
| F | Basal plus 0.01% cyclohexylideneaminooxyacetic acid. | | |
| G | Basal plus 0.02% cyclohexylideneaminooxyacetic acid. | 185 | 1.44 |
| H | Basal plus 0.02% cyclohexylideneaminooxyacetic acid. | | |

*Example 5*

A test is conducted using the basal diet described in Example 4 and three identical groups of 40 cross-bred male chicks. Group 1 is fed a basal diet only. Group 2 is fed a basal diet plus 0.01% cyclohexyliedeneaminooxyacetic acid. Group 3 is fed a basal diet plus 0.01% isopropylideneaminooxyacetic acid. After a four week floor pen test the results obtained are as follows:

| Group | Treatment | Index of performance (gain$^2$/feed) | Average weight gain | Average feed/gain |
|---|---|---|---|---|
| 1 | Basal only | *315 (0) | 517 | 1.64 |
| 2 | Basal plus 0.01% cyclohexylideneaminooxyacetic acid. | *343 (9) | 548 | 1.60 |
| 3 | Basal plus 0.01% isopropylideneaminooxyacetic acid. | *339 (8) | 545 | 1.61 |

*Number in parentheses indicate percentage increases over basal diet on basis of index of performance.

*Example 6*

A two week battery experiment was carried out to ascertain whether cyclohexylideneaminooxyacetic acid is well-tolerated and non-toxic to chicks at high levels. Five identical groups consisting of eight cross-bred male chicks each were treated as described below using the same basal diet described in Example 4. The results show that cyclohexylideneaminooxyacetic acid is well-tolerated and non-toxic to chicks even at high concentrations.

| Group | Treatment | Average index of performance (gain$^2$/feed) | Average percent increase over basal |
|---|---|---|---|
| 1 | Basal only | 98 | 0 |
| 2 | Basal plus 0.01% cyclohexylideneaminooxyacetic acid. | 114 | 16 |
| 3 | Basal plus 0.02% cyclohexylideneaminooxyacetic acid. | 125 | 28 |
| 4 | Basal plus 0.05% cyclohexylideneaminooxyacetic acid. | 133 | 36 |
| 5 | Basal plus 0.10% cyclohexylideneaminooxyacetic acid. | 129 | 32 |

*Example 7*

To demonstrate the effect of adding cyclohexylideneaminooxyacetic acid to a diet already supplemented with an antibiotic such as zinc bacitracin, test was carried out using three identical groups of 40 cross-bred male chicks and the same basal diet as that described in Example 4. It was found that the addition of cyclohexylideneaminooxyacetic acid creates an added response from chicks.

| Group | Treatment | Index of performance (gain²/feed) | Percent increase over basal |
|---|---|---|---|
| 1 | Basal (no antibiotic) | 57 | 0 |
| 2 | Basal plus 0.06% zinc bacitracin. | 87 | 53 |
| 3 | Basal plus 0.06% zinc bacitracin and 0.01% cyclohexylideneamino-oxyacetic acid. | 93 | 63 |

*Examples 8–540*

Each compound described above numbered 2–77 is substituted one at a time in like amount by weight for the cyclohexylideneaminooxyacetic acid in Examples 1–7. Each compound is formulated in the same manner as the cyclohexylideneaminooxyacetic acid described in Examples 1–7 and gives substantially the same results when administered to animals in like manner at like dosages.

In addition to the basal feeds described above, as illustrative of feeds which can be improved by the novel supplements of this invention, it will be understood that any of the basic animal feeds known in the art can be advantageously supplemented by an N-substituted aminooxyacetic acid, salt or ester thereof, according to this invention. These basic feeds, which contain carbohydrate, protein, fat, vitamins, and mineral sources are usually rather complex mixtures containing such nutrient elements as ground wheat, corn, oats, groats, fish meal, meat meal, dried milk, soybean oil meal and alfalfa meal. To these nutrients there is added bone meal, limestone, salt, choline chloride, vitamins, drugs including antibiotics or antibiotic like material such as zinc bacitracin, procaine penicillin G, tetra-cyclines, D-1-(p-sulfamylphenyl)-2-(alpha, alphadichloroacetamido)-1,3-propanediol and coccidiostats and other compatible growth promoters.

The above and similar examples can be carried out in accordance with the teachings of this invention by substituting one or more of the other compounds within the scope of the invention in the same concentrations for those illustrated in the examples, and substituting other diets for the exemplary diets recited above. The results obtained are substantially the same in that an improvement in weight gain and feed efficiency is demonstrated.

For convenience, the invention has been described primarily from the standpoint of a supplemented poultry or swine feed. It will be understood that in speaking of poultry feed herein is intended to include broadly chick feeds, broiler rations, and in general all feeds of chickens, turkeys, ducks, geese and other poultry. It will be further understood that dairy feed and feeds for such animals as sheep, goats, horses, steers, swine, dogs, cats, fish and the like can likewise be improved by including therein an N-substituted aminooxyacetic acid, salt or ester thereof according to this invention.

Thus, the foregoing detailed description has been given for clearness of understanding only and no unnecessary limitations are to be understood therefrom.

The invention claimed is:

1. An animal feed concentrate comprising from 1 to 50% by weight of a compound of the formula:

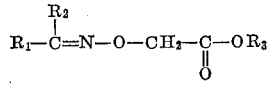

wherein $R_1$ is selected from the group consisting of hydrogen and alkyl of 1 through 6 carbon atoms;
$R_2$ is selected from the group consisting of hydrogen, alkyl of 1 through 5 carbon atoms and the radical —$CO_2R_3$—;
$R_3$ is selected from the group consisting of hydrogen, alkyl of 1 through 4 carbon atoms, sodium, potassium, calcium, and magnesium; and
$R_1$ and $R_2$ can be joined forming a cycloalkylene radical of the formula: —$(CH_2)_n$—, where $n$ is a whole positive integer of 4 through 6, both inclusive, and the cycloalkylene is substituted with a radical selected from the group consisting of hydrogen, methyl, ethyl, propyl and isopropyl.

2. An animal feed composition comprising animal feed and in an amount sufficient to provide feed conversion improvement in an animal, a compound of the formula:

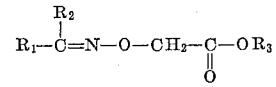

wherein $R_1$ is selected from the group consisting of hydrogen and alkyl of 1 through 6 carbon atoms;
$R_2$ is selected from the group consisting of hydrogen, alkyl of 1 through 5 carbon atoms and the radical —$CO_2R_3$—;
$R_3$ is selected from the group consisting of hydrogen, alkyl of 1 through 4 carbon atoms, sodium, potassium, calcium, and magnesium; and
$R_1$ and $R_2$ can be joined forming a cycloalkylene radical of the formula: —$(CH_2)_n$—, where $n$ is a whole positive integer of 4 through 6, both inclusive, and the cycloalkylene is substituted with a radical selected from the group consisting of hydrogen, methyl, ethyl, propyl and isopropyl.

3. A poultry feed containing carbohydrate, protein, fat, mineral, vitamins, antibiotics and antibiotic like material together 4 to 4000 grams for each ton of poultry feed of a compound of the formula:

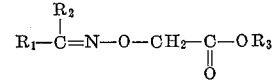

wherein $R_1$ is selected from the group consisting of hydrogen and alkyl of 1 through 6 carbon atoms;
$R_2$ is selected from the group consisting of hydrogen, alkyl of 1 through 5 carbon atoms and the radical —$CO_2R_3$—;
$R_3$ is selected from the group consisting of hydrogen, alkyl of 1 through 4 carbon atoms, sodium, potassium, calcium, and magnesium; and
$R_1$ and $R_2$ can be joined forming a cycloalkylene radical of the formula: —$(CH_2)_n$—, where $n$ is a whole positive integer of 4 through 6, both inclusive, and the cycloalkylene is substituted with a radical selected from the group consisting of hydrogen, methyl, ethyl, propyl and isopropyl.

4. A process comprising incorporating into the diet of an animal for each ton of feed, 4 to 4000 grams of a compound of the formula:

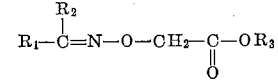

wherein $R_1$ is selected from the group consisting of hydrogen and alkyl of 1 through 6 carbon atoms;
$R_2$ is selected from the group consisting of hydrogen, alkyl of 1 through 5 carbon atoms and the radical —$CO_2R_3$—;
$R_3$ is selected from the group consisting of hydrogen, alkyl of 1 through 4 carbon atoms, sodium, potassium, calcium, and magnesium; and
$R_1$ and $R_2$ can be joined forming a cycloalkylene radical of the formula: —$(CH_2)_n$—, where $n$ is a whole positive integer of 4 through 6, both inclusive, and the cycloalkylene is substituted with a radical selected from the group consisting of hydrogen, methyl, ethyl, propyl and isopropyl.

5. A process comprising incorporating into the diet of an animal for each ton of feed, 4 to 4000 grams of cyclohexylideneaminooxyacetic acid.

6. A process comprising incorporating into the diet of an animal for each ton of feed, 4 to 4000 grams of cyclohexylideneaminooxyacetic acid, sodium salt.

7. An animal feed concentrate comprising from 1 to 50% by weight of cyclohexylideneaminooxyacetic acid.

8. An animal feed concentrate comprising from 1 to 50% by weight of cyclohexylideneaminooxyacetic acid, sodium salt.

9. An animal feed composition comprising animal feed and an amount of cyclohexylideneaminooxyacetic acid sufficient to provide feed conversion improvement in an animal.

10. An animal feed composition comprising animal feed and an amount of cyclohexylideneaminooxyacetic acid, sodium salt sufficient to provide feed conversion improvement in an animal.

References Cited by the Examiner
UNITED STATES PATENTS 3,051,573  8/1962  Kamlet.
3,115,518  12/1963  Kamlet _____ 99—2

A. LOUIS MONACELL, *Primary Examiner.*

DANIEL J. DONOVAN, *Assistant Examiner.*